(12) United States Patent
Doherty

(10) Patent No.: US 9,670,001 B2
(45) Date of Patent: Jun. 6, 2017

(54) AUTOMATED HANDLING LINE GUIDE RAIL ASSEMBLY

(71) Applicant: ZEPF Technologies UK Limited, Cumbernauld (GB)

(72) Inventor: Thomas Doherty, Glasgow (GB)

(73) Assignee: ZEPF Technologies UK Limited, Cumbernauld (GB)

( * ) Notice: Subject to any disclaimer, the term of this patent is extended or adjusted under 35 U.S.C. 154(b) by 0 days.

(21) Appl. No.: 14/990,005

(22) Filed: Jan. 7, 2016

(65) Prior Publication Data

US 2016/0194155 A1   Jul. 7, 2016

(30) Foreign Application Priority Data

Jan. 7, 2015   (GB) .................................. 1500191.0

(51) Int. Cl.
| B65G 21/20 | (2006.01) |
| B65G 29/00 | (2006.01) |
| B65G 47/84 | (2006.01) |

(52) U.S. Cl.
CPC ......... B65G 29/00 (2013.01); B65G 21/2072 (2013.01); B65G 47/846 (2013.01); B65G 2201/0244 (2013.01); B65G 2207/08 (2013.01)

(58) Field of Classification Search
CPC ........ B65G 21/22; B65G 21/20; B65G 47/84; B65G 29/00; B65G 47/846
USPC ............ 198/723, 836.1, 836.3, 836.2, 836.4, 198/459.2
See application file for complete search history.

(56) References Cited

U.S. PATENT DOCUMENTS

| 2011/0127143 A1* | 6/2011 | Calzolari ........... B65G 21/2072 198/618 |
| 2011/0272246 A1 | 11/2011 | Papsdorf |
| 2013/0075236 A1 | 3/2013 | Bell et al. |

FOREIGN PATENT DOCUMENTS

| EP | 1 663 824 A2 | 6/2006 |
| GB | 2 415 419 A | 12/2005 |
| JP | H04 94309 A | 3/1992 |

(Continued)

OTHER PUBLICATIONS

Search Report for UK Patent Application No. GB 1500191.0 dated Jun. 5, 2015.

(Continued)

*Primary Examiner* — Leslie A Nicholson, III
*Assistant Examiner* — Lester Rushin
(74) *Attorney, Agent, or Firm* — Alston & Bird LLP

(57) ABSTRACT

An automated handling line guide rail assembly is provided for use on an automated handling line that is adjustable to define a path of varying width. The assembly comprises a segmented guide rail, with segments that define a generally arcuate perimeter of the path, the perimeter being positioned at a radius from a central axis. An actuator member is rotatable about the central axis and is arranged to extend at a substantially constant radius from the central axis. Rotation of the actuator member causes substantially radial movement of the segments thereby allowing the segments to define the perimeter at a plurality of different radii. The segments are positioned and have a width such that adjacent segments overlap each other. Their overlapping portions move circumferentially relative to each other when the segments move radially such that the extent of overlap of adjacent segments varies with the radial position of the segments.

17 Claims, 6 Drawing Sheets

(56) References Cited

FOREIGN PATENT DOCUMENTS

| WO | WO 2004/074142 A1 | 9/2004 |
| WO | WO 2005/030616 A2 | 4/2005 |
| WO | WO 2009/109802 A1 | 9/2009 |

OTHER PUBLICATIONS

European Search Report for Application No. EP 16 15 0092 dated Jun. 7, 2016.

* cited by examiner

AUTOMATED HANDLING LINE GUIDE RAIL ASSEMBLY

CROSS REFERENCE TO RELATED APPLICATION

This application claims priority to and the benefit of United Kingdom Application No. 1500191.0, filed Jan. 7, 2015, the entire contents of which are hereby incorporated by reference.

FIELD OF THE INVENTION

The present invention relates to an automated handling line guide rail assembly for use on an automated handling line where containers are being processed. In particular, the present invention relates to an adjustable guide rail assembly whose position may be altered to define paths of varying width.

BACKGROUND TO THE INVENTION

A typical application of the present invention is on a bottling line where a container such as a bottle may first be rinsed, then filled, capped and labelled. Each of these processes is generally performed by a separate machine at different locations along the automated handling line. The containers are conveyed between the various machines along generally rectilinear paths and are presented to and taken from the various machines along arcuate paths where the spacing between containers is regulated to match the required spacing of the processing machine by using a star wheel and guide rail assembly.

Such a star wheel and guide rail assembly combination is described in our European Patent No. EP-B-1,663,824. Essentially, a guide rail assembly defines the outer limit of an arcuate path along which the bottles are conveyed by the star wheel. A guide rail assembly generally comprises upper and lower guide rails that support a container at two heights. As the name suggests, a star wheel is a rotating wheel of a generally star shape, the star shape being defined by a plurality of recesses that receive a container to be processed. In operation, the star wheel rotates such that the first bottle presented to the star wheel is received within a recess. The container is then conveyed along a path defined by the star wheel and the guide rail that runs around and is spaced from the centre line of the path to be fed upon exit to a processing machine. As will be appreciated, the spacing between the recesses in the star wheel determines the spacing with which containers are passed to the machine.

Any particular automated handling line is likely to process containers having a variety of different shapes and sizes. EP-B-1,663,824, referenced above, discloses both an adjustable star wheel and an adjustable guide rail. The recesses in the star wheel are adjustable to allow larger containers to be received and the guide rail may also be moved closer to and further away from the star wheel. The star wheel and guide rail may be adjusted in a co-ordinated fashion such that centreline along the path is preserved, i.e. the centre point of the containers being conveyed must be preserved, for example to allow the bottle to be filled at the same position.

JP H04 94309 discloses a segmented guide rail having upper and lower rails. The segments of each rail are attached to rods that pass through bores provided in a mounting block. The segments are driven by the rods that are constrained by the bores to move radially such that the guide rails may be moved to define arcuate paths set at different radii.

SUMMARY OF THE INVENTION

Against this background, and from a first aspect, the present invention resides in an automated handling line guide rail assembly comprising a segmented guide rail, an actuator member and a cam mechanism. The segmented guide rail comprises segments that together define the guide rail. In turn, the guide rail and hence the segments define the perimeter of a path that a container will follow when conveyed along part of an automated handling line. The perimeter is generally arcuate about a central axis and positioned at a radius from the central axis. Namely, the perimeter forms part of the circumference of a circle whose centre corresponds to the central axis. The perimeter may subtend any angle. Generally, the automated handling line guide rail assembly will be used with a star wheel that rotates about the central axis.

The actuator member is rotatable about the central axis and is arranged to extend at a substantially constant radius from the central axis. Thus, the actuator member may be elongate and arcuate to extend in a direction to maintain the constant radius.

The cam mechanism links the segments to the actuator member such that rotation of the actuator member about the central axis causes substantially radial movement of the segments relative to the central axis. This movement allows the segments to define the perimeter at a plurality of different radii from substantially the same central axis, thereby allowing the width of the path to be adjusted. The cam mechanism and actuator member may allow the segments to be positioned at any position within a range of movement or may allow the segments to be positioned in a number of predetermined positions.

The segments overlap. Specifically, the segments are positioned and have a width such that adjacent segments overlap each other. The overlapping portions are free to move relative to each other such that when the segments move radially. When moved radially, the segments will move together or move apart because as the radius from the central axis changes, so too must the part of circumference that the segments define. As the segments move radially and move relative to each other in the circumferential direction, the overlapping portions also move circumferentially relative to each other. Hence, the extent of overlap of adjacent segments varies with the radial position of the segments. When set to a relatively narrow radius relative to the central axis, the extent of overlap between adjacent segments is at its greatest: conversely, the overlap is at its least when the segments are set to a relatively wide radius.

The use of a segmented guide rail is useful as it allows more flexibility over a single piece guide rail. For example, the use of segments allows the arc shape to be replicated better across a range of radii. For a single piece guide rail, the curvature of the guide rail is fixed. However, using a segmented guide rail allows the individual segments to move closer together or further apart from each other as they are driven radially. Although the curvature of each segment is fixed, this movement together and apart better approximates the required arc. The curvature of each segment may be chosen to be substantially the curvature required for the arcuate perimeter at the middle of the range of radial movement of the segments. Moreover, the spacing between the segments varies, and the overlapping portions means that continuous guide rail may be provided to extend along the varying circumferential lengths as the guide rail is set to varying radii.

Optionally, the overlap of adjacent segments is maintained throughout the range of radial movement of the segments. In this way, a container being conveyed along handling line will always be supported by a segment of the guide rail. Embodiments are contemplated where gaps between segments may arise, for example when the segmented guide rail is set to wider radii positions. Such gaps may not appreciably interfere with the passage of containers along the handling line.

The segments may be arranged side by side with the overlapping portions provided at the sides of adjacent segments at different heights. For example, the segments at the ends of the guide rail assembly may be provided with overlapping portions on their inner sides, whereas the inner segments may be provided with an overlapping portion at each of their sides. The overlapping portions may be provided at alternating heights, for example one segment may have relatively high overlapping portions and the adjacent portions may have relatively low overlapping portions, and so on.

A segmented guide rail may otherwise suffer from the weakness that it is difficult to maintain its shape whilst being moved. In the present invention, the cam mechanism ensures that each of the segments is driven radially. Furthermore, guide means may be employed in this invention to constrain the path followed by the segments as they are driven by the cam mechanism and to ensure the shape of the guide rail as a whole is preserved.

For example, the automated handling line guide rail assembly may comprise a guide member. The segments may be positioned to rest on the guide member with at least a portion of each segment received by a correspondingly sized and shaped channel provided in the guide member. For instance, the rear part of each segment may reside within the channel. Optionally, the guide means may be provided with an arcuate front face corresponding to the perimeter to be set at a maximum radius from the central axis. In this position, the segments may be positioned radially so as to be pulled back within the channel or such that the front faces of the segments are coterminous with the front face of the guide means, such that all of each the segment resides within the channel. When perimeters of smaller radii are set, the segments will be driven radially inwards such that only a portion of each segment remains within the channel. The edges of each segment and its associated channel may be aligned substantially radially with respect to the central axis thereby constraining movement of each segment to be radial when driven by the cam mechanism. For example, the edges may be parallel and aligned with a radius through the centre of the channel. Thus the cam mechanism converts rotational movement of the actuator member into radial translation of each segment. The cam mechanism may comprise a linkage such as pivoting link arms to connect the actuator member to the segments. Alternatively, the cam mechanism may comprise post and slot arrangements to connect the arcuate actuator member to the segments.

As examples of the latter arrangement, the actuator member may be positioned above the segments thereby sandwiching part of each segment between the actuator member and the guide member. Two arrangements may then be used. In a first arrangement, each segment is provided with a diagonal slot and the actuator member is provided with posts that extend into the diagonal slots of the segments. In a second arrangement, each segment is provided with a post and the actuator member is provided with diagonal slots that are positioned to receive the posts of the segments. In both arrangements, rotation of the actuator member about the central axis will drive the posts along the diagonal slots thereby causing radial movement of the segments within the channels. Optionally, the guide member is arcuate and the posts are positioned at a constant radius relative to the central axis.

The segments may comprise a relatively narrow base block and a relatively wide guide rail section. The adjacent segments may be positioned such that guide rail sections of adjacent segments overlap to create the overlapping portions. Optionally, the base blocks are provided with the diagonal slot or the post and at least a portion of the base blocks reside within the channels. The base blocks may rest with their bases at a common height, and the vertical positions of the guide rail sections of adjacent segments may be different thereby creating the overlapping portions. The guide rail sections may be mounted to tops of the base blocks, and the height of the base blocks of adjacent segments may be different. The front face of each base block may be coterminous with the front face of its associated guide rail section, such that both the guide rail section and the base block may provide support to a container being conveyed through the guide rail assembly. The heights of the base blocks may alternate between adjacent segments. This is advantageous as it requires only two designs of base block, a set of relatively tall base blocks and a set of relatively short base blocks. For example, the height of the entire base block may vary, or the tall base blocks may have a body of the same height as the short base blocks, but the tall base blocks may be provided with a step to which the guide rail section is attached.

Optionally, the actuator member rests on the guide member and either (a) the guide member is provided with posts and the actuator member is provided with diagonal slots that are positioned to receive the posts of the guide member, or (b) the guide member is provided with diagonal slots and the actuator member is provided with posts that extend into the diagonal slots. In either arrangement, the automated handling line guide rail assembly may further comprise an actuator operable to cause relative movement of the actuator member and the guide member. The slots may be arcuate and extend to maintain a constant radius from the central axis to create the required rotation of the actuator member about the central axis.

The actuator may be provided with a threaded axle mounted to a support attached to one of actuator member and the guide member, while the other of actuator member and the guide member may be coupled to a threaded bolt hole that receives the threaded axle, such that rotation of the threaded axle causes the relative movement of the actuator member and the guide member. For example, the guide member may be provided with a threaded bolt hole or the guide member may be joined to a part provided with the bolt hole, such as a block with a protrusion that is received within a hole provided in the guide member.

Optionally, at least one of the segments is provided with a position indicator and the guide member is provided with a scale extending in radial direction with respect to the central axis, or vice versa. The scale may be located adjacent or in superposition with the position indicator to indicate the radial position of the segment. This aids an operator when setting the guide rail to a required position.

The present invention also extends to a guide rail assembly comprising first and second guide rails wherein both guide rails correspond to any of the guide rails described above, and wherein the second guide rail is positioned above the first guide rail. Such an arrangement provides support at two heights to a container being conveyed through the guide rail assembly.

Optionally, the actuator member of the second guide rail is connected to the actuator member of the first guide rail so that they move in unison. Alternatively, the first and second guide rails may be arranged such that they may be adjusted independently.

When the actuator member of each guide rail is provided with the diagonal slots and the guide member of each guide rail is provided with the posts described above, the posts may connect the guide member of the first guide rail to the guide member of the second guide rail through the slots provided in the actuator members. Optionally, the second guide rail is inverted relative to the first guide rail and is separated from the first guide rail by one or more spacers. Then the components of the guide rail assembly may be stacked as follows:

the guide member of the first guide rail may be positioned at the bottom, the actuator member of the first guide rail may rest on the guide member of the first guide rail, the one or more spacers may rest on the actuator member of the first guide rail, the actuator member of the second guide rail may rest on the spacer block, and the guide member of the second guide rail may rest on the actuator member of the second guide rail.

The one or more spacers may take many forms. For example, a plate or block may be used as a spacer. Alternatively, posts may be used. For example, posts may be used to connect the guide member of the first guide rail to the guide member of the second guide rail through the slots provided in the actuator members, as mentioned above: collars around the posts may then be used to space apart the actuator members at a pre-determined separation.

BRIEF DESCRIPTION OF THE DRAWINGS

In order that the invention can be more readily understood, reference will now be made by way of example only, to the accompanying drawings in which.

DETAILED DESCRIPTION OF THE INVENTION

Figure 1:
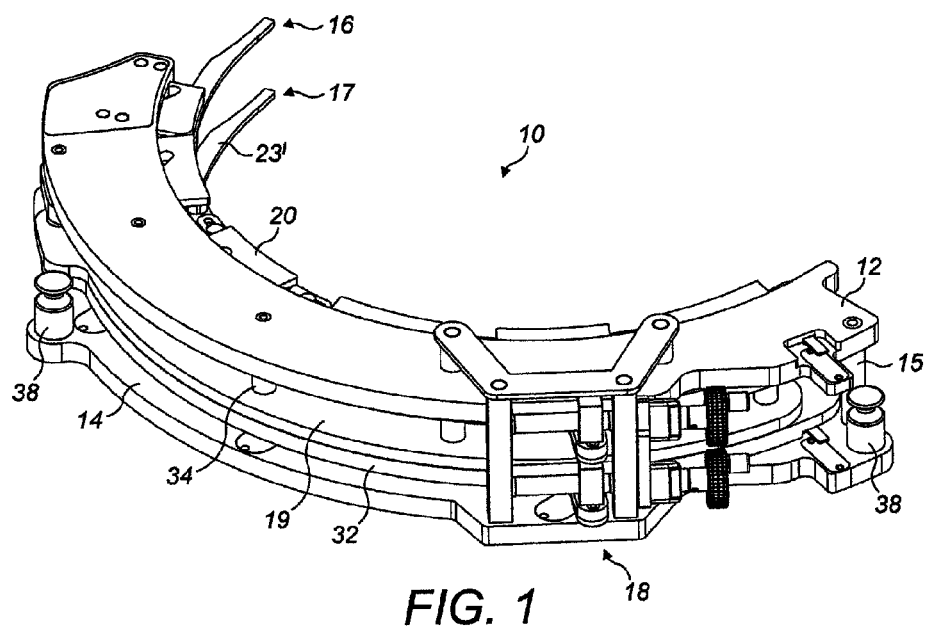
FIG. 1 is an isometric view of an automated handling line guide rail assembly according to the present invention from above and behind.

An automated handling line guide rail assembly 10 defining a generally arcuate path corresponding to the arc of a circle about a central axis is shown in the accompanying figures. The arc covers an angle of approximately 170°, although other guide rails of other lengths to cover other angles may be used. The guide rail assembly 10 comprises a generally flat, elongate structure bounded by a guide members, namely a top guide plate 12 and a bottom guide plate 14 that are separated by posts 15 and 34. The guide rail assembly 10 also comprises a pair of segmented guide rails 16 and 17 defining a front arcuate surface. The segmented guide rails 16 and 17 correspond in size and shape and are positioned one 16 above the other 17.

Each segment 20 of the segmented guide rails 16 and 17 extends back into the body of the guide rail assembly 10. The rear of each segment 20 is sandwiched between one of the guide plates 12, 14 and an actuator plate 32, 33. That is, the segments 20 of the lower guide rail 17 are sandwiched between the bottom guide plate 14 and the lower actuator plate 32, with the lower actuator plate 32 positioned above the bottom guide plate 14. The upper guide rail 16 is inverted. Namely, the segments 20 of the upper guide rail 16 are sandwiched between the upper actuator plate 33 and the top guide plate 12, with the top guide plate 12 positioned above the upper actuator plate 33. The separation of the guide rails 16 and 17 is set using the posts 15. Namely, the posts 15 set the separation of the top and bottom guide plates 12 and 14 which hold in position the segments 20 forming the guide rails 16 and 17. A cover plate 19 is also included in this embodiment. The cover plate 19 sits immediately above the lower actuator plate 32 to protect the lower actuator plate 32 from spillages, for example from liquid-filled containers being conveyed along the handling line.

An actuator mechanism 18 is provided at the back of the guide rail assembly 10 to allow independent adjustment of the upper and lower guide rails 16 and 17. As can best be seen from FIG. 11, the actuator mechanism 18 comprises upper and lower hand wheels 19 and 20 that may be turned to effect adjustment of the upper and lower segmented guide rails 16 and 17 respectively.

Figure 9:
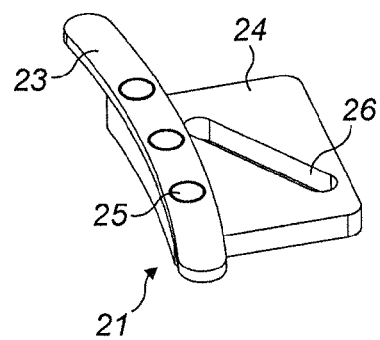
FIG. 9 is an isometric view of a segment.

The segmented guide rails 16 and 17 are divided into various segments 20 that combine to form the top and bottom guide rails 16 and 17. The segments 20 are divided into two types, hereinafter referred to as short segments 21 and tall segments 22. An example of a short segment 21 is shown in FIG. 9. The short segment 21 comprises a guide rail section or guide rail piece 23 joined to the top of a base block 24 by three pegs 25. The guide rail piece 23 is arcuate and presents a thin support surface at its front that will contact and support a container as it is conveyed through the guide rail assembly 10. The guide rail piece 23 is held in place on the base block 24 by the pegs 25 such that the front support surface of the guide rail piece 23 is aligned with a front support surface of the base block 24. Hence, a container passing through the guide rail assembly 10 is supported by the front support surfaces of both the base block 24 and the guide rail piece 23. The guide rail piece 23 is wider than the base block 24 such that the guide rail piece 23 extends to either side of the base block 24. The base block 24 is also provided with a diagonal slot 26 that penetrates through the base block 24. The purpose of this diagonal slot 26 will be described below. All short segments 21 correspond to the segment 21 shown in FIG. 9, with the exception of one short segment 21' which will be described below.

The tall segments 22 generally correspond to the short segments 21, except that their guide rail pieces 23 reside at a different height than those of the short segments 21. This difference in height arises because the base blocks 24 of the tall segments 22 are provided with a step 28 at their fronts. The guide rail pieces 23 are attached to the top of these steps 28, and the steps 28 create a taller front support surface of the base blocks 24.

Figure 2:
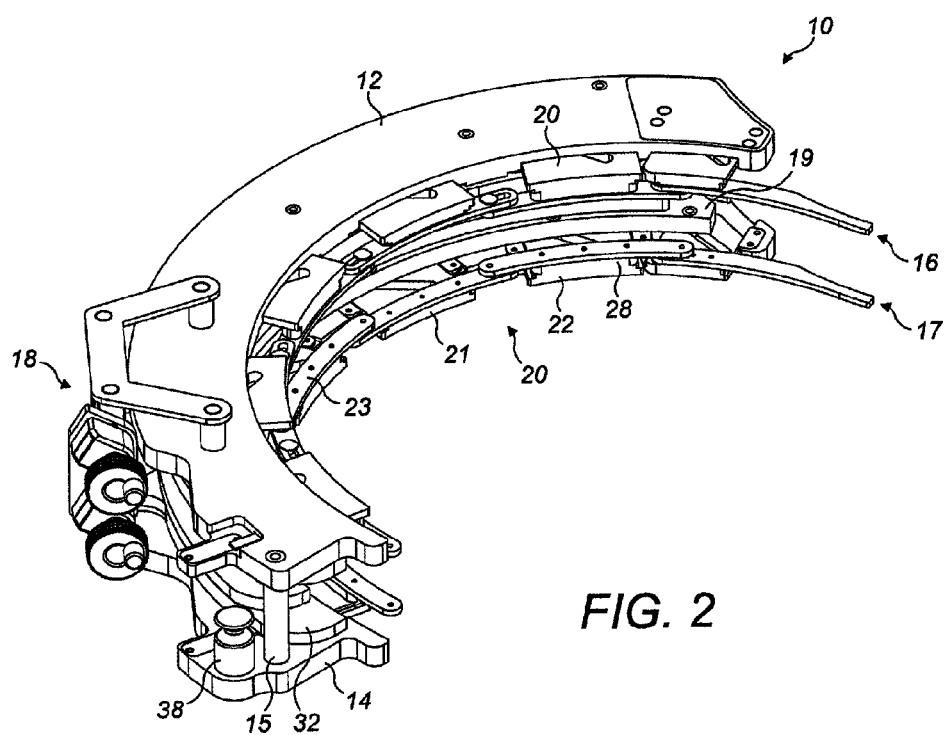
FIG. 2 is an isometric view of the guide rail assembly of FIG. 1 from above and in front.
Figure 3:
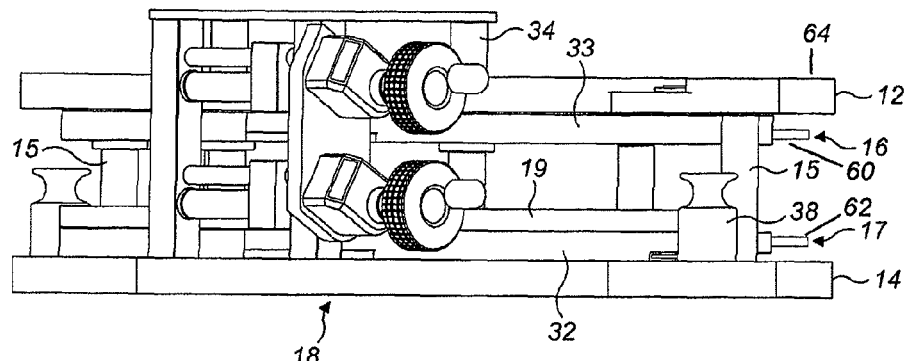
FIG. 3 is a side elevation of the guide rail assembly of FIG. 1.
Figure 4:
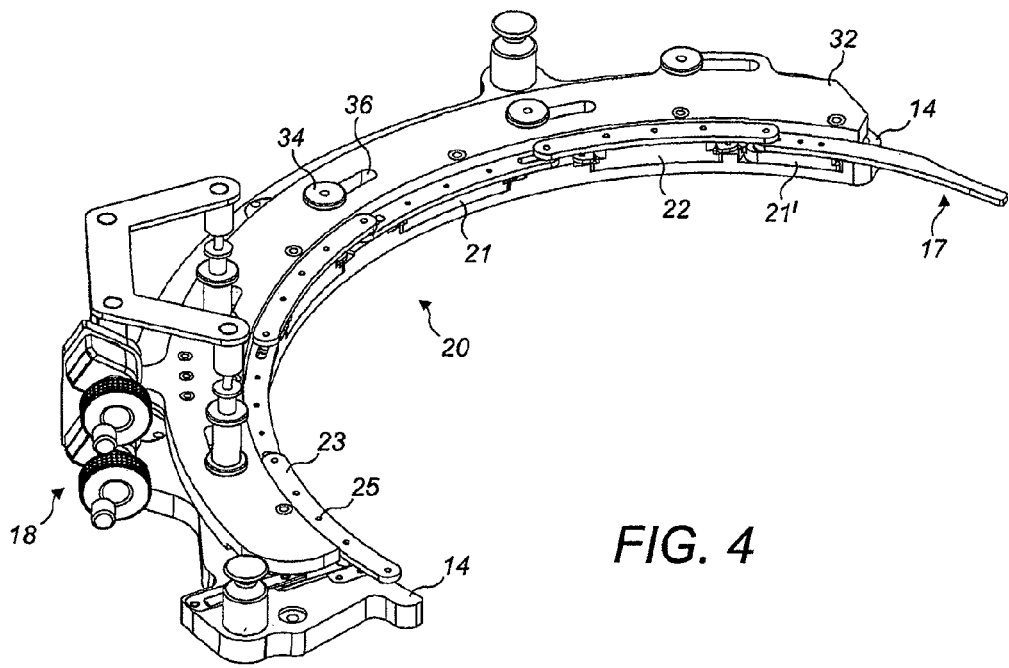
FIG. 4 is an isometric view of the guide rail assembly of the embodiment of FIG. 1 from above and in front, with some parts removed for clarity and showing the segmented guide rail retracted.

As can be seen from FIG. 2, the short and tall segments 21 and 22 alternate around the guide rail assembly 10 in each of the upper and lower guide rails 16 and 17. It will also be seen that the upper guide rail 16 is inverted relative to the lower guide rail 17. In the lower guide rail 17, the guide rail pieces 23 are joined to the tops of the base blocks 24, as shown in FIG. 9. For the upper guide rail 16, the segments 20 are inverted such that the guide rail pieces 23 are now located on the bottom of the segments 20.

For both the upper and lower guide rails 16 and 17, the guide rail pieces 23 of adjacent segments 20 overlap, such that the ends of the guide rail pieces 23 form overlapping portions. These overlapping portions are slightly separated from each other vertically.

Each of the upper and lower guide rails 16 and 17 start with a tall segment 22 and finish with a unique short segment 21'. The short segment 21' has the same design of base block 24 as all the other short segments 21 such that the guide rail piece 23' is held at the same height. However, the guide rail piece 23' is lengthened relative to the other guide rail pieces 23 that are the same for both short and tall segments 21 and 22. The lengthened guide rail piece 23' is provided to ensure assured hand-off of containers to a star wheel.

The guide rails 16 and 17 may be adjusted so as to define arcuate paths at different radii from a central axis, that is the guide rails 16 and 17 define perimeters describing part of a circumference of a circle at a fixed radial distance from the central axis. Adjustment of the radial position of the lower guide rail 17 will now be explained with reference to FIGS. 4 to 10 that omit the parts of the upper guide rail 16 for the sake of clarity.

Figure 10:
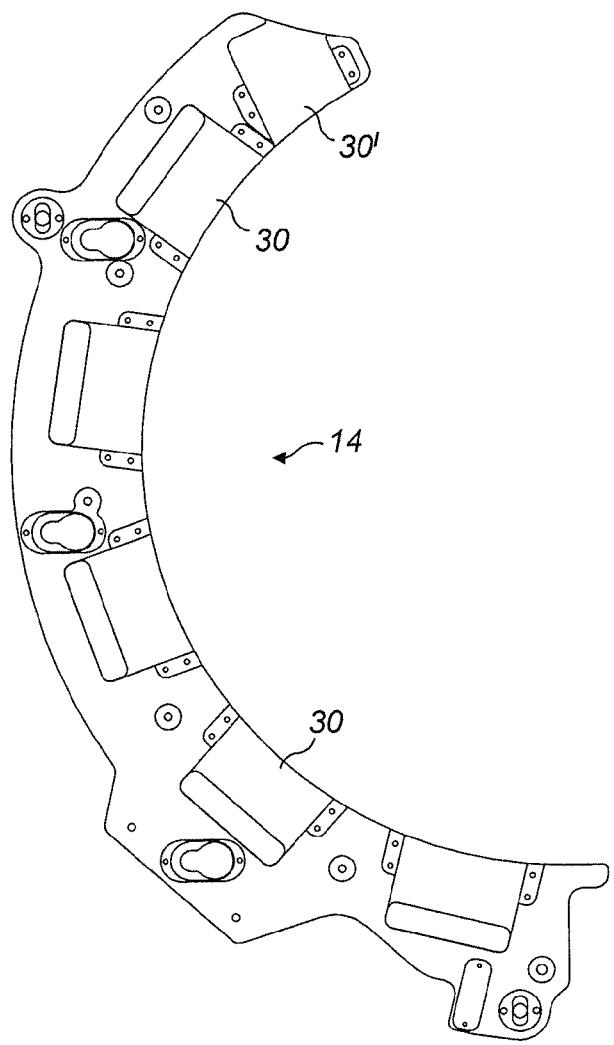
FIG. 10 is a plan view of the guide member.

FIG. 10 shows that the bottom guide plate 14 is provided with a series of channels 30. The channels 30 are sized and shaped so as to receive the base blocks 24 of the segments 20. The channels 30 are oriented such that the side walls defining the channels 30 are aligned and extend radially with respect to the centreline through the channels. The channels 30 have an open front such that the base blocks 24 may slide radially in and out of the channels 30. The height of the channels 30 is equal to that of the base blocks 24 such that the tops of the base blocks 24 are flush with the top of the bottom guide plate 14. The guide rail pieces 23 of the short segments 21 sit just above the top of the bottom guide plate 14, whereas the guide rail pieces 23 of the tall segments 22 are held clear of the bottom guide plate 14 by the steps 28. In a retracted position, the base blocks 24 sit entirely within the channels 30 such that the front surface of the bottom guide plate 14 is coterminous with the front support faces of the guide rail pieces 23 and the base blocks 24. Hence, when the guide rail assembly 10 is set to its widest setting with the segments 20 fully retracted within the channels 30, containers are supported by the front faces of the bottom guide plate 14, the base blocks 24 and the guide rail pieces 23.

Figure 6:
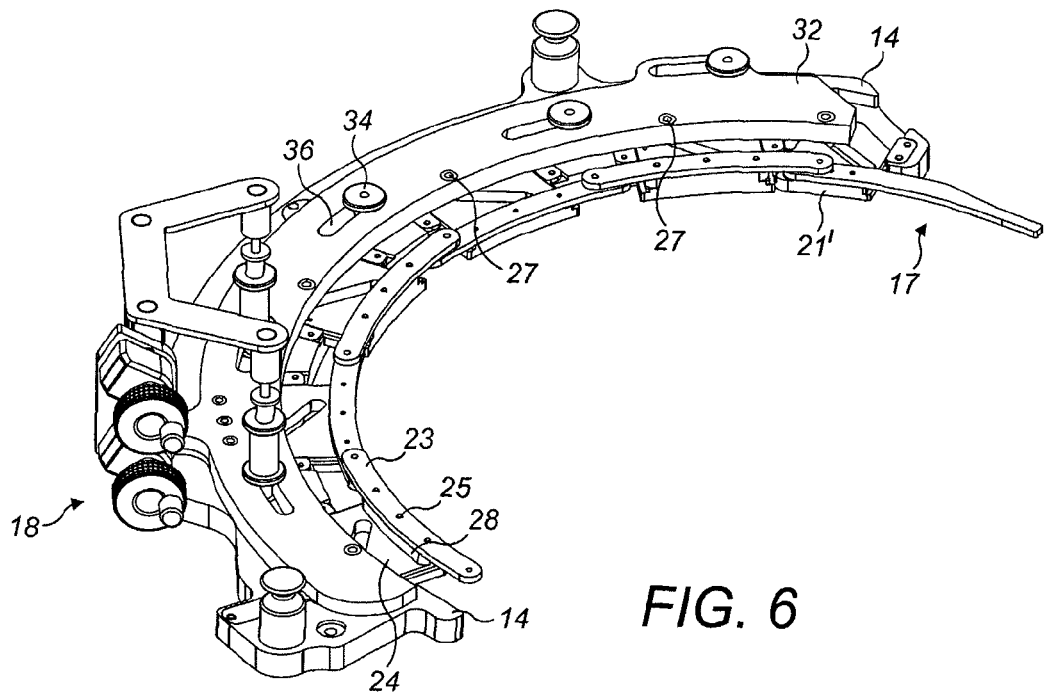
FIG. 6 corresponds to FIG. 4, but with the segmented guide rail in an extended position.
Figure 7:
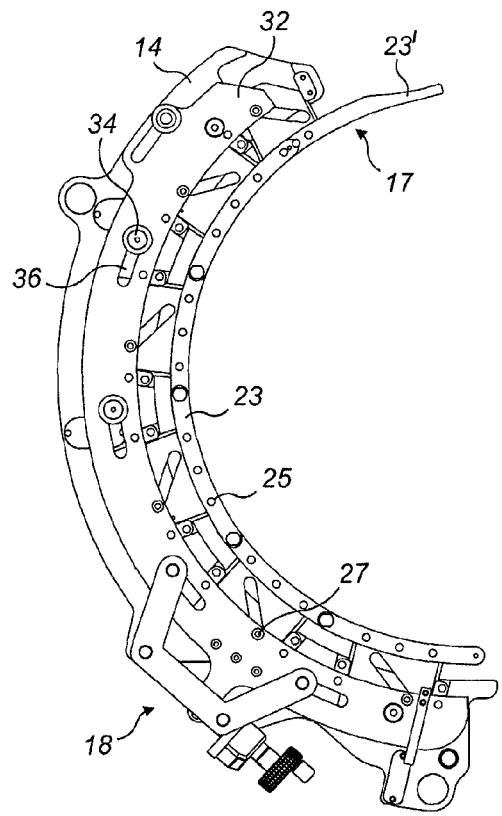
FIG. 7 is a plan view of the guide rail assembly of FIG. 6.
Figure 8:
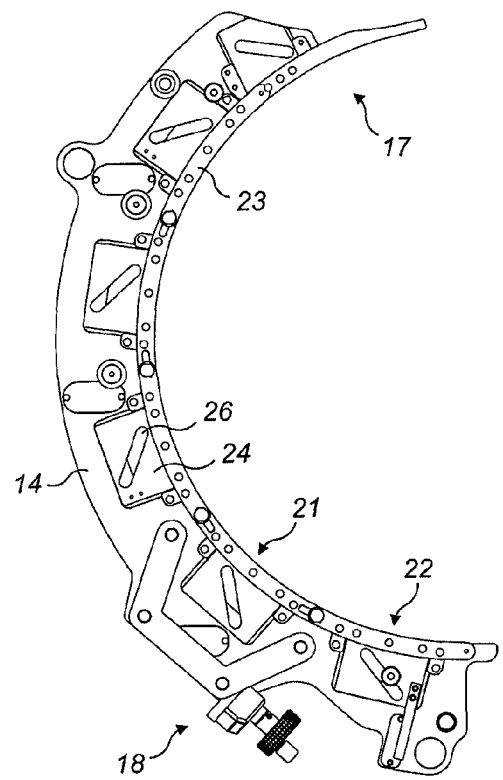
FIG. 8 is a plan view corresponding to FIG. 5, but with the actuator plate removed to show the segments and guide plate.

The lower guide rail 17 may then be adjusted by moving all the segments 20 such the front part of each segment 20 moves out of its channel 30, as can be seen in FIGS. 6 and 7. The sides of the channels 30 are aligned as described above so as to constrain all the segments 20 to move radially with respect to the central axis. In this embodiment, there is one exception in that the end segment 21' is located within a channel 30' having a different alignment. That is, the edges of the end channel 30' are aligned more acutely as can best be seen from FIG. 10: this alignment causes the segment 21' to move further towards the adjacent segment 22 and to impart a tightening to the arc at the end of the lower guide rail 17. This ensures clearance with respect to a star wheel that receives containers conveyed through the guide rail assembly 10.

As the segments 20 move radially, their 20 separation must either increase or decrease as the circumference of the arc they subtend changes. For example, when being driven inwardly, the segments 20 will move together to define a smaller circumference as the outer limit of the path through the guide rail assembly 10. As the segments 20 move inwardly and their separation decreases, the overlap between adjacent guide pail pieces 23 will increase as the segments 20 move together. Thus, as the guide rails 16 and 17 are moved, the outer limit of the path the container will follow as it passes through the guide rail assembly 10 changes to match the change in radius. This change in circumference is provided by the expandable gaps between the base blocks 24 that are spanned by the overlapping portions of the guide rail pieces 23, with these gaps allowing the guide rails 16 and 17 as a whole to expand and contract as they are moved radially.

The segments 20 are arranged so that they are driven to move together in a co-ordinated fashion. A cam action is used to convert rotational movement of a lower actuator plate 32 into the required radial translation of the segments 20.

As can be seen from FIGS. 4 to 7, the lower actuator plate 32 sits on top of the bottom guide plate 14 and the rear parts of the base blocks 24. The lower actuator plate 32 is narrower than the bottom guide plate 14, such the front face of the lower actuator plate 32 sits deeper than the front face of the bottom guide plate 14, thereby accommodating the guide rail pieces 23 when the segments 20 are in their retracted positions.

The bottom guide plate 14 is fixed in position, for example to a frame or other support such as a core plate. In this embodiment, buttons 38 are used to attach and detach the guide rail assembly 10 to and from a core plate. The buttons 38 are provided on the bottom guide plate 14, which is also to be fixed in position. Two buttons 38 are used to allow easy two-handed operation.

The lower actuator plate 32 can move relative to the bottom guide plate 14. This relative movement is constrained to be a rotation about the central axis by virtue of a slot and post arrangement. That is, posts 34 extend from the bottom guide plate 14 to the top guide plate 12 to connect the pair of guide plates 12 and 14 to each other. These posts 34 pass though arcuate slots 36 provided in the lower actuator plate 32 and a corresponding upper actuator plate 33. The posts 34 also extend through holes provided in the cover plate 19. The arcuate slots 36 provided in the actuator plates 32 and 33 extend at a fixed radius with respect to the central axis, such that the slots 36 and posts 34 constrain the rotational movement of the actuator plates 32 and 33.

Figure 5:
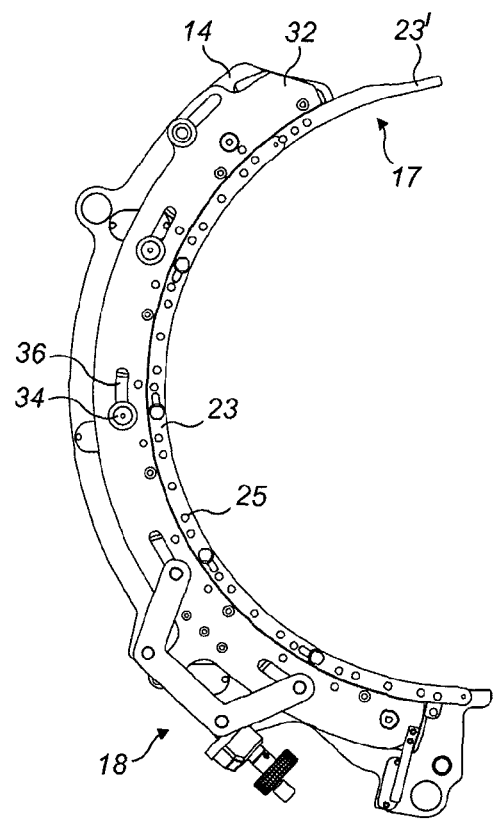
FIG. 5 is a plan view of the guide rail assembly of FIG. 4.

The diagonal slots 26 provided in the base blocks 24 are sandwiched between the bottom guide plate 14 and the lower actuator plate 32. The lower actuator plate 32 is provided with a series of pins 27, with each of the pins 27 being received within one of the diagonal slots 26. As the lower actuator plate 32 rotates about the central axis, the pins 27 move along an arcuate path at a fixed radius with respect to the central axis. The interference of the pins 27 within the diagonal slots 26 causes the pins to drive the segments 20 radially: the segments 20 must move radially as constrained within the channels 30 to maintain the coincidental position of the pins 27 within the diagonal slots 26. FIG. 7 shows the position of the pins 27 within the ends of the diagonal slots 26 when the segments 20 are in their fully extended position. FIG. 5 is a corresponding view of the segments 20 when fully retracted. In this embodiment, the length of the diagonal slots 26 of the segments 20 is matched to the length of the arcuate slots 36 in the lower actuator plate 32, such that both lengths define the range of radial movement of the segments 20. In other contemplated embodiments, the length of the slots 26 and 36 need not be matched such that either the length of the arcuate slots 26 or the length of the diagonal slots 36 may define the range of movement. A variety of container sizes may be accommodated with the design of the present invention. For example, bottles having widths of 23 mm up to 90 mm may easily be accommodated.

Figure 11:
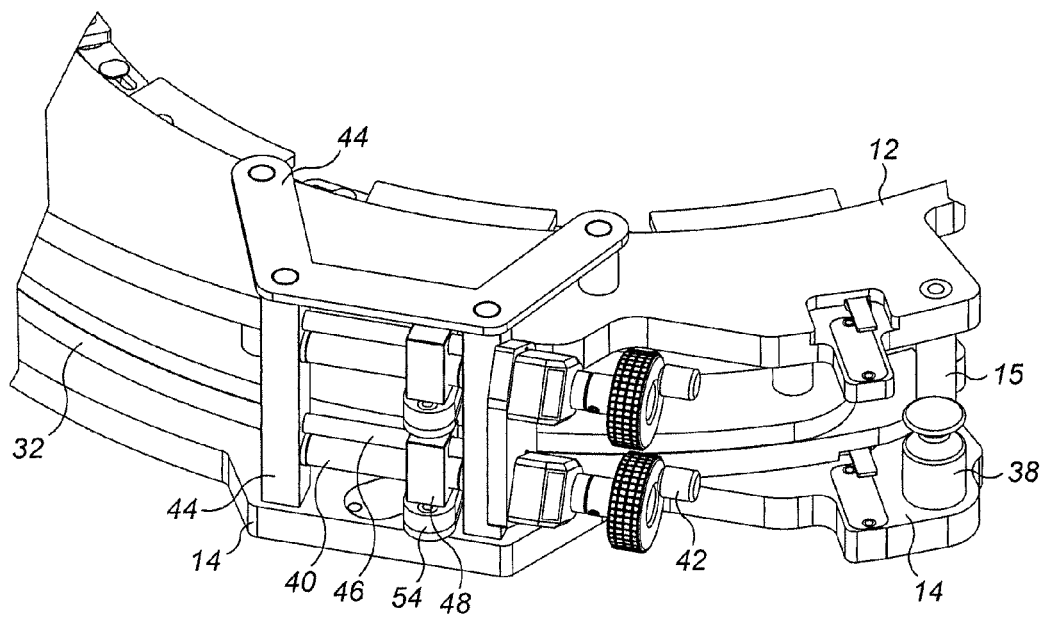
FIG. 11 is an isometric view from above and behind of the actuator mechanism.
Figure 12:
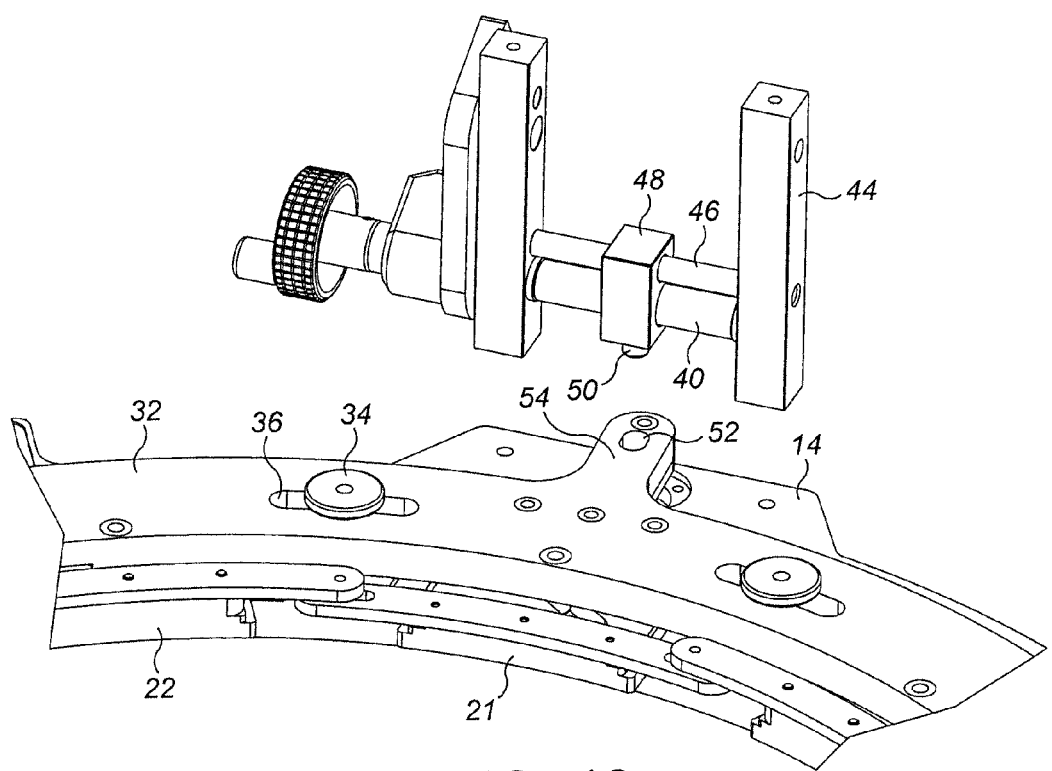
FIG. 12 is a part-exploded view of the actuator mechanism of FIG. 11.

The actuator plates 32 and 34 are driven by an actuator mechanism 18 best seen in FIGS. 11 and 12. The actuator mechanism 18 provides independent adjustment for the upper and lower guide rails 16 and 17. Both guide rails are adjusted in the same way, and so only a single adjustment mechanism will be described.

A threaded rod 40 is provided with a handle 42 at its end. The threaded rod 40 is retained towards its ends by opposed sides of a frame 44 that is fixed to the top guide plate 12 and the bottom guide plate 14, thereby fixing the frame 44 in position too. The frame 44 attaches to the tops of a pair of lengthened posts 34 of the top guide plate 12. The threaded rod 40 rotates freely relative to the frame 44 such that the threaded rod 40 only rotates and does not translate. The thread of the rod 40 extends between the sides of the frame 44. A plain rod 46 also extends between the opposed sides of the frame 44 and is aligned with the threaded rod 40. A block 48 is mounted on the pair of rods 40 and 46. The block 48 is provided with a plain bore through which the plain rod 46 extends. The block 48 is also provided with a threaded bore through which the threaded rod 40 extends. The threads of the rod 40 and block 48 are complementary such that rotation of the handle 42 causes the threaded rod 40 to rotate, thereby driving the block 48 to translate along the threaded rod 40 and plain rod 46 (the plain rod 46 is present to prevent rotation of the block 48 as the threaded rod 40 is rotated).

The base of block 48 is provided with a protrusion 50 that is received within an elongate hole 52 provided in a lobe 54 extending from the rear of the lower actuator plate 32, as best seen in the part-exploded view of FIG. 12. As can be seen, the hole 52 is elongated transverse to the direction of translation of the block 48, and the width of the hole 52 is matched to the width of the protrusion 50. Thus, translation of the block 48 causes the protrusion 50 to drive rotation of the lower actuator plate 32. As the actuator plate 32 is constrained to rotate by the slot and post arrangement 34 and 36, the elongation of the hole 52 accommodates the slightly different linear path of the protrusion 50 as the block 48 translates.

Therefore, movement of the lower guide rail 17 is effected as follows. An operator turns a handle 42. This causes the threaded rod 40 to turn which drives the block 48. This, in turn causes the protrusion 50 of the block 48 to drive rotation of the connected lower actuator plate 32. The pins 27 of the lower actuator plate 32 move, causing the segments 20 including their guide rail pieces 23 to be translated radially as the pins 27 are retained within the diagonal slots 26 of the segments 20. Rotation of the handle 42 in one direction will cause the segments 20 to move radially inwardly, and rotation of the handle 42 in the other direction will cause the segments 20 to move radially outwardly.

Each of the upper and lower actuator plates 32 and 33 are provided with a lobe 54 with elongate hole 52 to co-operate with the protrusion 50 of one of a pair of threaded rods 40, handles 42, plain rods 46 and blocks 48 of the actuator mechanism 18. Consequently, the positions of the upper and lower guide rails 16 and 17 may be set independently. For example, containers having a tapering shape may be accommodated and supported at different heights, or drinks bottles may be conveyed with the lower guide rail 17 set at a relatively wide position to support the wide body of a bottle and the upper guide rail 16 set at a relatively narrow position to support the narrow neck of the bottle.

The actuating mechanism 18 should be robust enough to allow the guide rails 16 and 17 to be set securely into position. However, if additional security is required, other mechanisms may be employed to fix the position of the guide rails 16 and 17. For example, one of more clamps may be used to clamp the bottom guide plate 14 and lower actuator plate 32 together, and similarly one of more clamps may be used to clamp the top guide plate 12 and upper actuator plate 33 together.

Each guide rail 16 and 17 is provided with a position indicator 60. Each position indicator 60 comprises a flat plate with a straight edge 62 that extends from the rear of each actuator plate 32 and 33. The straight edge 62 extends adjacent to a scale 64 provided on the top of each guide plate 12 and 14 to allow the position of the guide rails 16 and 17 to be determined. One of the plates providing the straight edge 62 is mounted directly to the lower actuator plate 32. As the upper actuator plate 33 is positioned beneath the top guide plate 12 in the inverted arrangement of the upper guide rail 16, the plate providing the straight edge 62 is mounted indirectly to the upper actuator plate 33 via a pillar that extends up and through a co-operating hole provided in the top guide plate 12.

A skilled person would appreciate that the above embodiment may be varied in many different respects without departing from the appended claims.

Although the above embodiment has a guide rail assembly 10 that defines an arcuate path, other shapes are clearly also possible. For example, elliptical or part-elliptical shapes can easily be achieved, as can other serpentine paths. One possibility is an S-shaped path where some segments 20 of the guide rails 16 and 17 will move closer together while the separation of other segments 20 will increase.

While the above embodiment has a pair of guide rails 16 and 17 to support a container at different heights, any other number of guide rails 16, 17 may be used. For example, a single guide rail 16 or 17 may be appropriate, particularly if it is taller. Alternatively, three, four or even more guide rails 16, 17 may be used, particularly for tall containers or containers of varying widths. As mentioned above, the guide rails 16 and 17 may either be fixed together to move in unison or each guide rail 16 and 17 may be independently adjustable.

Whilst the above embodiment employs six segments 20 per guide rail 16 and 17, clearly more or fewer segments 20 may be chosen for any particular purpose. More segments 20 are better in terms of invariance in the shape of the guide rails 16 and 17 as they move. This is because each individual segment 20 has a fixed radius of curvature (which may be chosen to be a maximum value or an average value for the required paths) and it is the expandable gaps between the base blocks 24 of the segments 20 that allow the overall shape of the guide rails 16 and 17 to be maintained. However, the more segments 20, the greater the complexity of the guide rail assembly 10 so there will always be a trade-off in this respect. However many segments 20 are chosen, they may all be driven using the same actuator mechanism and combination of diagonal slots and posts.

While the above embodiment sees an inverted arrangement for the upper and lower guide rails 16 and 17, and their associated guide plates 12 and 14 and actuator plates 32 and 33, this need not be the case. That is, the arrangement of the upper and lower guide rails 16 and 17, and their associated guide plates 12 and 14 and actuator plates 32 and 33 may be the same.

Rather than provide independent adjustment of the upper and lower guide rails 16 and 17, the upper and lower guide rails 16 and 17 may be linked so as to move in unison. For example, a single actuator mechanism 18 may be provided to drive either the upper or lower guide rails 16 or 17, and the upper and lower guide rails and 17 may be connected to move in unison. For example, the upper and lower actuator plates 32 and 33 may be connected by pillars such that they rotate together: then the diagonal slots may be angled differently such that the guide rails 16 and 17 move by different amounts. Alternatively, the segments 20 of the upper and lower guide rails 16 and 17 may be joined directly, for example by pillars.

The above embodiment uses manual adjustment of the guide rails' 16 and 17 positions, although it will be straightforward for the person skilled in the art to effect automatic actuation, for example to allow computer-controlled setting of the guide rails 16 and 17.

The guide rail assembly 10 described above uses several complementary pin and slot type arrangements, for example the diagonal slots 26/pins 27 of the base blocks 24/actuator plates 32 and 33, the posts 34/arcuate slots 36 of the guide plates 12 and 14/actuator plates 32 and 33, and the protrusion 50/hole 52 of the block 48/actuator plates 32 and 33. It does not matter which way around the pin and slots are arranged, and hence any of these arrangements described above may be reversed. Likewise, the edge 62 and scale 64 of the position indicator 60 may also be reversed.

The invention claimed is:

1. An automated handling line guide rail assembly comprising a segmented guide rail, an actuator member and a cam mechanism, wherein:
   the segmented guide rail comprises segments that together define the perimeter of a path that a container will follow when conveyed along part of an automated handling line, the perimeter being generally arcuate about a central axis and positioned at a radius from the central axis;
   the actuator member is rotatable about the central axis and is arranged to extend at a substantially constant radius from the central axis;
   the cam mechanism links the segments to the actuator member such that rotation of the actuator member about the central axis causes substantially radial movement of the segments relative to the central axis thereby allowing the segments to define the perimeter at a plurality of different radii from substantially the same central axis;
   the segments are positioned and have a width such that adjacent segments overlap each other with overlapping portions that move circumferentially relative to each other when the segments move radially such that the extent of overlap of adjacent segments varies with the radial position of the segments;
   wherein the automated handling line guide rail assembly further comprises a guide member, wherein the segments are positioned to rest on the guide member with at least a portion of each segment received by a correspondingly sized and shaped channel provided in the guide member, the edges of each segment and its associated channel being aligned and extending substantially radially with respect to the central axis thereby constraining movement of each segment to be radial; and
   wherein the actuator member is positioned above the segments thereby sandwiching part of each segment between the actuator member and the guide member, and
   either
   (a) each segment is provided with a diagonal slot and the actuator member is provided with posts that extend into the diagonal slots of the segments,
   or
   (b) each segment is provided with a post and the actuator member is provided with diagonal slots that are positioned to receive the posts of the segments,
   such that rotation of the actuator member about the central axis drives the posts along the diagonal slots thereby causing radial movement of the segments within the channels.

2. The automated handling line guide rail assembly of claim 1, wherein the overlap of adjacent segments is maintained throughout the range of radial movement of the segments.

3. The automated handling line guide rail assembly of claim 1, wherein the segments are arranged side by side with the overlapping portions provided at the sides of adjacent segments at different heights.

4. The automated handling line guide rail assembly of claim 1, wherein the guide member is arcuate and the posts are positioned at a constant radius.

5. The automated handling line guide rail assembly of claim 1, wherein the segments comprise a relatively narrow base block and a relatively wide guide rail section, and wherein the adjacent segments are positioned such that guide rail sections of adjacent segments overlap to create the overlapping portions.

6. The automated handling line guide rail assembly of claim 5, wherein the base blocks are provided with the diagonal slot or the post, and at least a portion of the base blocks reside within the channels, wherein the base blocks rest with their bases at a common height, and wherein the vertical positions of the guide rail sections of adjacent segments is different thereby creating the overlapping portions.

7. The automated handling line guide rail assembly of claim 6, wherein the guide rail sections are mounted to tops of the base blocks and the height of the base blocks of adjacent segments is different and, optionally, the front face of each base block is coterminous with the front face of its associated guide rail section.

8. The automated handling line guide rail assembly of claim 7, wherein heights of the base blocks alternate.

9. The automated handling line guide rail assembly of claim 1, wherein the actuator member rests on the guide member, and
   either (a) the guide member is provided with posts and the actuator member is provided with diagonal slots that are positioned to receive the posts of the guide member, or (b) the guide member is provided with diagonal slots and the actuator member is provided with posts that extend into the diagonal slots, the automated handling line guide rail assembly further comprising an actuator operable to cause relative movement of the actuator member and the guide member, and wherein the slots are arcuate and extend to maintain a constant radius from the central axis such that the actuator member rotates about the central axis.

10. The automated handling line guide rail assembly of claim 9, wherein the actuator is provided with a threaded axle mounted to a support attached to one of actuator member and the guide member, the other of actuator member and the guide member has a threaded bolt hole that receives the threaded axle, such that rotation of the threaded axle causes the relative movement of the actuator member and the guide member.

11. The automated handling line guide rail assembly of claim 1, wherein at least one of the segments or the guide member is provided with a position indicator and the other of the at least one of the segments or the guide member is provided with a scale extending in radial direction with respect to the central axis, the scale being located adjacent or in superposition with the position indicator to indicate the position of the segment.

12. The guide rail assembly of claim 1, further comprising a clamping mechanism operable to clamp the guide rail in position.

13. The guide rail assembly of claim 1, further comprising a second guide rail like the guide rail of claim 1, and wherein the second guide rail is positioned above the first guide rail.

14. The guide rail assembly of claim 13, wherein the actuator member of the second guide rail is connected to the actuator member of the first guide rail so that they move in unison.

15. The guide rail assembly of claim 9, further comprising a second guide rail like the guide rail of claim 11, and wherein the second guide rail is positioned above the first guide rail and wherein the actuator member of the second guide rail is connected to the actuator member of the first guide rail so that they move in unison.

16. The guide rail assembly of claim 15, wherein the actuator member of each guide rail is provided with the diagonal slots, and the posts received within the slots connect the guide member of the first guide rail to the guide member of the second guide rail.

17. The automated handling line guide rail assembly of claim 15, wherein the second guide rail in inverted relative to the first guide rail and is separated from the first guide rail by one or more spacers, such that
- the actuator member of the first guide rail rests on the guide member of the first guide rail,
- the one or more spacers rest on the actuator member of the first guide rail,
- the actuator member of the second guide rail rests on the spacer block, and
- the guide member of the second guide rail rests on the actuator member of the second guide rail.

* * * * *